March 6, 1945.  B. DICK  2,370,942
PISTON CONSTRUCTION
Filed Sept. 23, 1942  2 Sheets-Sheet 1
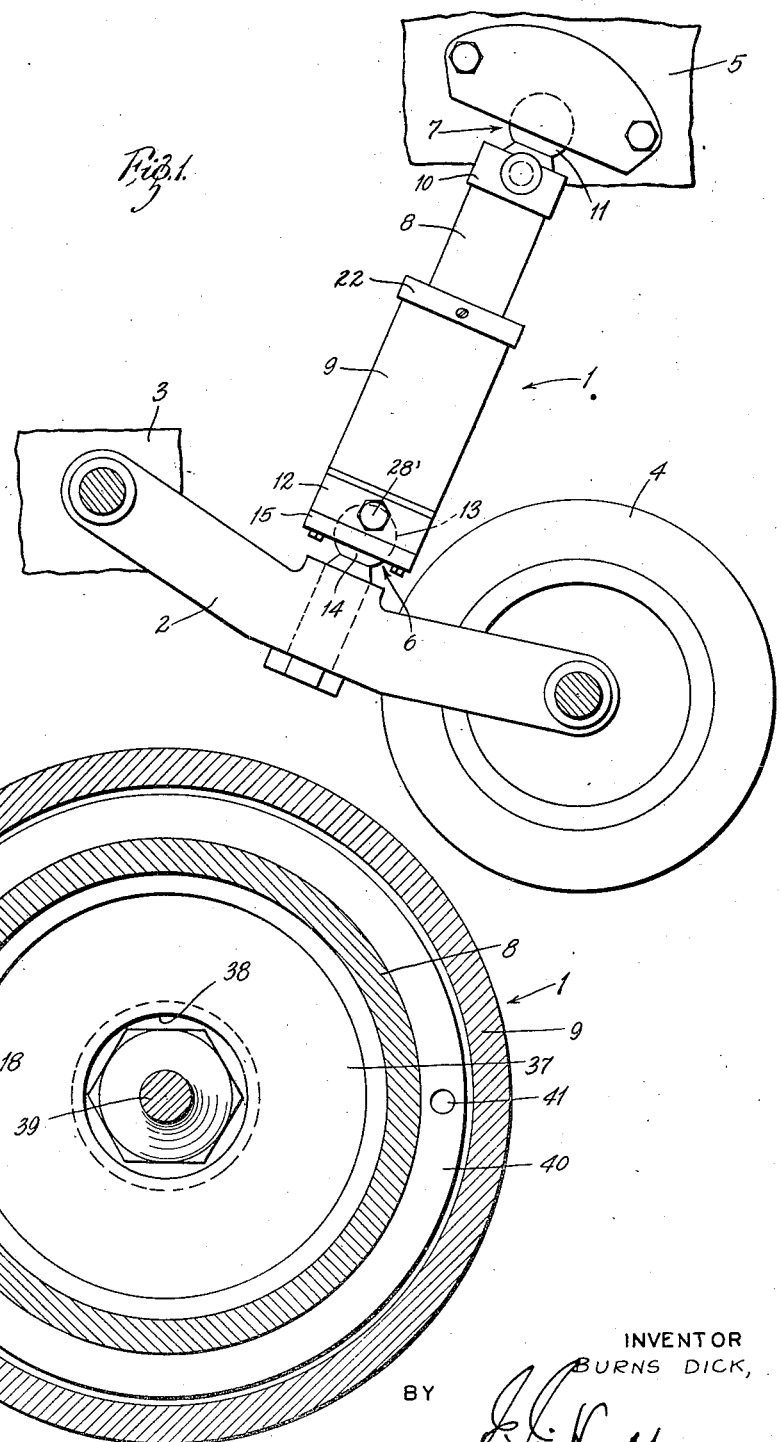
INVENTOR
BURNS DICK,
BY
ATTORNEY March 6, 1945.　　　　　B. DICK　　　　2,370,942
PISTON CONSTRUCTION
Filed Sept. 23, 1942　　　2 Sheets-Sheet 2
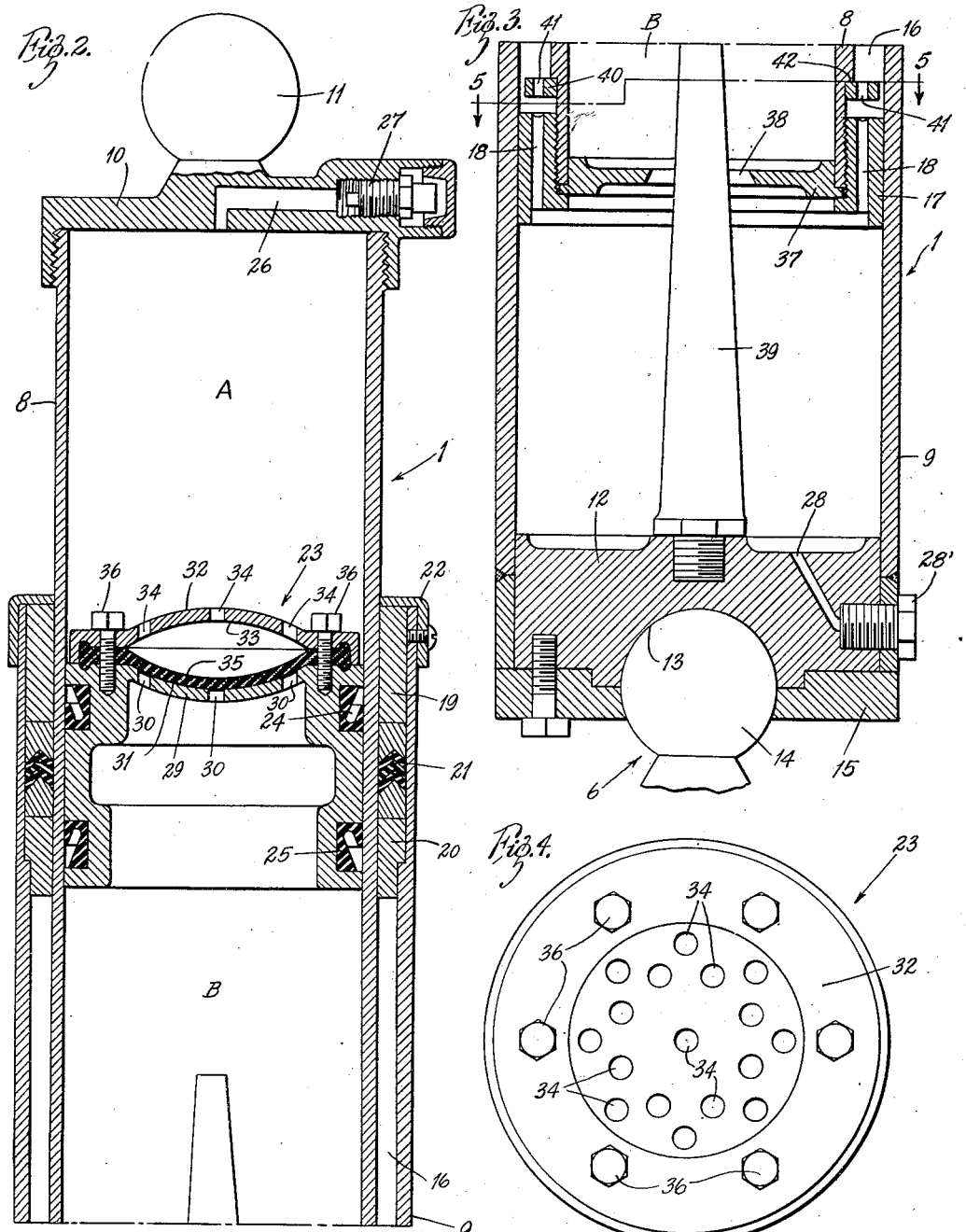
INVENTOR
BURNS DICK,
BY
ATTORNEY Patented Mar. 6, 1945

2,370,942

UNITED STATES PATENT OFFICE 2,370,942

PISTON CONSTRUCTION

Burns Dick, Ferguson, Mo., assignor to Wagner Electric Corporation, St. Louis, Mo., a corporation of Delaware Application September 23, 1942, Serial No. 459,416

8 Claims. (Cl. 267—64)

My invention relates to piston constructions and more particularly to a piston construction for use in a device wherein the piston acts as a movable partition between two fluids which are caused to have varying equal pressures.

One of the objects of my invention is to so construct a piston of the type referred to that small variations in fluid pressure on one side of the piston will be transmitted to fluid under pressure on the opposite side of the piston without any relative movement between the piston and the cylinder wall in which it is mounted.

A more specific object is to so associate a diaphragm with a piston that small variations of the pressure of the fluid on one side of the piston can be transmitted to fluid under pressure on the opposite side of the piston without movement of the piston and thereby maintain the pressures of the fluids equalized.

Still another object of my invention is to produce an improved yieldable device having telescoping cylinders containing two different fluids under pressure and being separated by a piston capable of relative movement with respect to the cylinders in which it is mounted.

Other objects of my invention will become apparent from the following description taken in connection with the accompanying drawings in which Figure 1 is a view of an improved yieldable device having structure embodying my invention, said device being used as a strut between the vehicle and a wheel therefor; Figures 2 and 3 are enlarged longitudinal sectional views of the upper and lower parts of the strut showing details thereof; Figure 4 is an end view of the piston; and Figure 5 is a sectional view taken on the line 5—5 of Figure 3.

Referring to the drawings in detail and first to Figure 1, I have shown my improved yieldable device I employed, by way of example, as a strut between a wheel of a vehicle and the chassis or body thereof. However, it is noted that the device may be used wherever it is desired to have a yieldable support, a suspension device, a rebound control device, a shock absorbing device, an energy storing device, and so forth. As shown in Figure 1, arm 2 is pivoted at one end to a part of the chassis or body 3 of a vehicle and its other end has rotatably mounted thereon a wheel 4. Between arm 2 and another body part 5 of the vehicle there is interposed the device or strut I, the connection being made by ball and socket connections 6 and 7.

The yieldable device or strut I is shown in detail in Figures 2, 3, 4, and 5, reference to which is now made. The strut is composed of two telescoping cylinders 8 and 9, the former being closed at its upper end by a cap 10 provided with a ball 11 forming part of the ball and socket connection 7 and cylinder 9 being closed at its lower end by a cap 12 provided with a socket 13 for receiving ball 14 of the ball and socket connection 6, said ball being held in the socket by a plate 15. The external diameter of cylinder 8 is somewhat less than the internal diameter of cylinder 9, thus producing a chamber 16 between the walls of the two cylinders. The lower end of cylinder 8, which is received in cylinder 9, carries a sleeve 17 which has such an external diameter as to snugly fit in cylinder 9 so as to properly guide the lower end of cylinder 8. This sleeve is provided with a plurality of circumferentially spaced openings 18 for placing chamber 16 in communication with the interior of cylinder 9 below the sleeve.

The upper end of cylinder 9 carries bearing sleeves 19 and 20 between which is interposed suitable annular packing means 21 to prevent fluid from leaking past the two cylinders yet permitting the cylinders to have relative axial movement. The bearing sleeves and packing means are held in position by a retaining cap 22 secured to the upper end of cylinder 9.

Within cylinder 8 is a piston 23 dividing the space within the two cylinders into an upper chamber "A" and a lower chamber "B," the former being solely within cylinder 8 and the latter within the lower part of cylinder 8 and the cylinder 9, said chamber "B" also including chamber 16 between the walls of the cylinders. The piston carries packing cups 24 and 25 to prevent fluid from leaking past the piston periphery in either direction, thus eliminating any possibility of the fluids in the chambers becoming mixed. Chamber "B" is filled with non-compressible fluid such as oil or hydraulic brake fluid and chamber "A" is filled with a compressible fluid or gas, preferably air, under pressure. Air is admitted into chamber "A" through an inlet 26 in cap 10 which is controlled by an air pressure check valve 27. The non-compressible fluid is admitted to chamber "B" through a passage 28 in cap 12 when the closure plug 28' is removed.

When the chambers "A" and "B" are filled with fluid with the air in chamber "A" under pressure, the yieldable device or strut will be in operative condition. Under these conditions the pressures in both chambers are the same as the piston only acts as a movable separating wall.

As the device operates when the vehicle moves, cylinders 8 and 9 will move relatively to each other both in an inward and an outward direction. As cylinder 8 moves inwardly with respect to cylinder 9, piston 23 will be forced upwardly, thus placing the air in chamber "A" under additional pressure since the volume thereof will be decreased. When cylinder 8 moves outwardly with respect to cylinder 9, piston 23 will move downwardly with respect to cylinder 9 and the volume of chamber "A" will increase. Since the air in chamber "A" is compressible, it will act as a cushioning means between the wheel and the frame of the vehicle and thus absorb road shocks.

When the piston 23 is of the ordinary type, that is, one with a solid head, it will move relatively to cylinder 8 each time there is an increase or a decrease in the force acting on the strut. Since a large majority of the changes in forces acting on the strut will be small due to the wheel moving over fairly even roadway most of the time, the extent of movement of the piston will be small and in the form of vibrations. These piston vibrations will result in considerable wear on the packing cups and will shorten their lives. Also continual movement of the piston will increase the possibility of some leakage past the cups and an undesirable mixing of the fluids.

In accordance with my invention I have so designed the piston 23 that these small movements or vibrations will be eliminated and yet the air in chamber "A" and the liquid in chamber "B" will be maintained equal. In carrying out my invention the head wall 29 of the main part of the piston is provided with a plurality of perforations 30 and the outer surface thereof shaped to provide a concave surface 31. Attached to the head of the piston is a plate 32 having a concave surface 33 on the side adjacent the concave surface 31. This plate is also provided with perforations 34. Peripherally clamped between the plate and the head wall 29 of the piston is a diaphragm 35 made of rubber, synthetic rubber, flexible metal, or other suitable material, the clamping action being obtained by the attaching bolts 36.

With a piston construction as described it is seen that if there should be a small downward movement of cylinder 8 with respect to cylinder 9, the volume of chamber "A" will be decreased without movement of the piston since under these conditions the diaphragm will move upwardly independently of the piston. The pressures of the liquid in chamber "B" and the air in chamber "A" will thus be increased as desired and remain equal. A similar action will take place when the relative downward movement of cylinder 8 is followed by a slight relative upward movement of cylinder 8 because then the diaphragm is so positioned that it can move downwardly as the volume of chamber "A" expands. It is thus apparent that by the piston carried diaphragm partition between the two fluids small relative movement of the two cylinders will not cause piston movement yet piston movement is retained for conditions where there is a large relative movement between the two cylinders. There will be no possibility of the diaphragm becoming pierced by the perforations 31 and 34 since it is strong enough to withstand momentary differential pressures sufficient to move the pistons against the friction drag of the sealing cups.

There are conditions under which it is desired to control the flow of fluid from the lower part of cylinder 9 to the lower part of cylinder 8, said conditions being when a considerable force acts on the device to move the cylinders toward each other as, for example, when the entire weight of the vehicle comes down upon the device as a large obstruction is encountered or when the vehicle goes over an embankment. In order to control the flow of fluid between the two cylinder portions of chamber "B" and prevent a too rapid build up of pressure in the portion of chamber "B" at the bottom of piston 23, there is provided a wall 37 at the lower end of cylinder 8. This wall is held on the cylinder by the bearing sleeve 17 and is provided with an opening 38. Extending into this opening is a tapered pin 39 carried by and extending upwardly from cap 12. From this construction it is seen that as cylinder 8 moves downwardly from its position shown in Figure 2, the area of the opening 38 will be gradually decreased, thus decreasing the rate of flow between the lower end of cylinder 9 and the lower end of cylinder 8. By decreasing the rate of flow, the downward movement of cylinder 8 will be slowed up or checked when there is a large force acting to move cylinders 8 and 9 toward each other, and the force will not become immediately effective on the piston and air chamber "A." The force will thereby be slowly absorbed.

Also, in order to check too rapid a separating movement of cylinders 8 and 9, there is provided a ring 40 for cooperation with the upper ends of passages 18 which places chamber 16 in communication with the lower part of cylinder 9. This ring, as seen in Figures 3 and 5, has two openings 41 and when fluid tends to flow out of chamber 16 due to the relative outward movement of cylinders 8 and 9, the ring will seat on top of sleeve 17 and all fluid must flow through these two openings 41. The ring will have no effect in controlling the flow of fluid through passages 18 when the cylinder 8 moves inwardly with respect to cylinder 9 since under these conditions the fluid flowing through passages 18 will lift the ring off sleeve 17 and flow around the ring. The ring in Figure 3 is shown in an unseated position and engaged with a shoulder 42 for limiting its unseating movement.

It is thus seen that there is provided an improved yieldable device in which the piston is so constructed that it does not have to move relatively to the cylinder in which it is mounted whenever there are small changes in the pressures of the separated fluid. The efficiency of the device is thereby improved.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a device of the class described having a cylinder and a piston therein forming a movable partition between two chambers, fluid under equal pressures in the chambers, means for changing the pressures in the chambers by a member movable relatively to the cylinder and acting on the fluid in one chamber, and means carried by the piston for permitting said pressures to remain equal without movement of the piston relatively to the cylinder whenever a slight change in pressure of the fluid in one chamber occurs.

2. In a device of the class described having a cylinder and a piston therein forming a movable partition between two chambers, fluid under equal pressures in the chambers, means for changing the pressures in the chambers by a member movable relatively to the cylinder and acting on the fluid in one chamber, and means carried by the piston for permitting said pressures to remain equal without movement of the piston relatively to the cylinder whenever a slight change in pressure of the fluid in one chamber occurs, said last named means comprising a member so associated with the piston as to be contacted on opposed surfaces by the fluids and capable of limited flexing movement.

3. In a device of the class described having a cylinder and a piston therein forming a movable partition between two chambers, fluid under equal pressures in the chambers, and means carried by the piston for permitting said pressures to remain equal without movement of the piston whenever a slight change in pressure of the fluid in one chamber occurs, said last named means comprising a diaphragm secured at its periphery to the piston and contacted on opposed sides by the fluids, and means for limiting the movement of the diaphragm in opposite axial directions with respect to the piston.

4. In a device of the class described having a cylinder and a piston therein forming a movable partition between two chambers, fluid under equal pressures in the chambers, and means carried by the piston for permitting said pressures to remain equal without movement of the piston whenever a slight change in pressure of the fluid in one chamber occurs, said last named means comprising a chamber in the piston provided with opposed perforated concave walls, and a diaphragm secured to the piston at its periphery and extending across the said concave walled chamber.

5. In a yieldable device of the class described, two relatively movable telescoping cylinders having their outer ends closed, a piston mounted in one of the cylinders and dividing the cylinders into two chambers, a non-compressible fluid in one chamber, a compressible fluid under pressure in the other chamber, and means carried by the piston for maintaining the pressures of the two fluids equal without movement of the piston whenever the cylinders have limited relative movement.

6. In a yieldable device of the class described, two telescoping cylinders having their outer ends closed, a piston mounted in one of the cylinders and dividing the cylinders into two chambers, a non-compressible fluid in one chamber, a compressible fluid under pressure in the other chamber, and an auxiliary chamber having a flexible diaphragm therein dividing said auxiliary chamber into two chambers carried by and movable with the piston, one of said members communicating with one of the first named chambers and the other communicating with the other of said first named chambers, said diaphragm compensating for limited variations in pressure in the main chambers without movement of the piston by varying the volume of the two chambers in said auxiliary chamber.

7. In a yieldable device of the class described, two telescoping cylinders having their outer ends closed, a piston mounted in one of the cylinders and dividing the cylinders into two chambers, a non-compressible fluid in one chamber, a compressible fluid under pressure in the other chamber, a diaphragm carried by the piston and contacted on opposite surfaces thereof by the compressible and non-compressible fluids, said diaphragm being capable of so flexing as to move in opposite directions axially of the piston, and means for limiting the extent of flexing of the diaphragm in the opposite directions.

8. In a yieldable device of the class described, two relatively movable telescoping cylinders having their outer ends closed, a piston mounted in one of said cylinders and dividing the device into two primary chambers, a non-compressible fluid in one chamber, a compressible fluid under pressure in the other chamber, an auxiliary chamber carried by and movable with the piston, and a flexible diaphragm dividing the auxiliary chamber into two independent parts each communicating with one of the primary chambers, the movement of the diaphragm being limited by the walls of the auxiliary chamber to restrict the compensating action resultant from said movement.

BURNS DICK.